United States Patent [19] [11] Patent Number: 4,926,032
Shimamura et al. [45] Date of Patent: May 15, 1990

[54] READER AND/OR WRITER FOR IC CARD

[75] Inventors: Norio Shimamura; Taiji Sudo, both of Tokyo, Japan

[73] Assignee: Tokyo Tatsuno Co., Ltd., Tokyo, Japan

[21] Appl. No.: 168,099

[22] Filed: Mar. 14, 1988

[30] Foreign Application Priority Data

Mar. 12, 1987 [JP] Japan .................. 62-58645

[51] Int. Cl.$^5$ .......................................... G06K 7/06
[52] U.S. Cl. ................................. 235/441; 235/479; 235/482; 235/486
[58] Field of Search ............... 235/441, 479, 480, 482, 235/485, 486

[56] References Cited

U.S. PATENT DOCUMENTS 4,187,980  2/1980  Schisselbauer et al. ........ 235/482 X
4,724,310  2/1988  Shimamura et al. ............ 235/441 X
4,835,375  5/1989  Shimamura et al. ............ 235/482 X
4,843,221  6/1989  Ohtsuki et al. ................. 235/441

Primary Examiner—David L. Trafton
Attorney, Agent, or Firm—Sughrue, Mion, Zinn, Macpeak & Seas

[57] ABSTRACT

A reader and/or writer for an IC card as external memory, which has an angularly movable arm and an extended lever longitudinally movable respectively for locking the card at the trailing edge and a carriage holding the card at the same time and adapted to be concurrently disengaged from the locking so as to assure reliable reading and/or writing without adverse affection of locking force on the IC card. A contact head having a plurality of contact points to be electrically connected with those of the card is held by a link mechanism so as to assure a stable relative movement therebetween for automatic cleaning regardless of varied thicknesses of the cards.

13 Claims, 3 Drawing Sheets

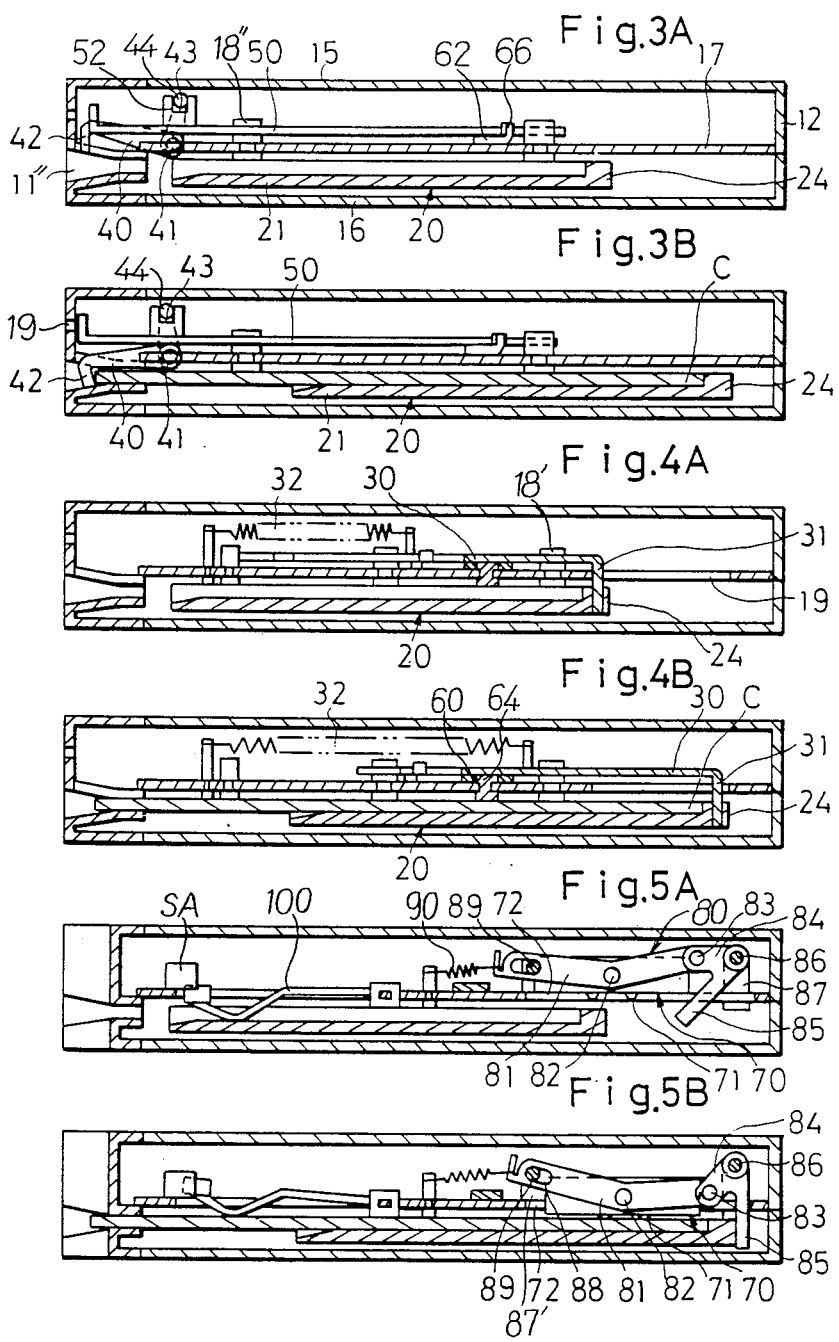

READER AND/OR WRITER FOR IC CARD

BACKGROUND OF THE INVENTION

The present invention relates generally to a reader and/or writer for an IC card as external memory, and more particularly to the device of a type having a casing, a carrier longitudinally movable in the casing but normally kept at a waiting position by spring means near to a slit formed in a front end wall of the casing for receiving the IC card inserted through said slit, and a contact head mounted in the casing near a back end wall so that when the IC card is manually pushed against the force of the spring means the IC card held by the carrier is brought to be electrically connected with the contact head for reading and/or writing.

In the device of the type referred to above, it is necessary to lock the card or the carriage supporting thereof in the position for reading and/or writing operation. For instance, U.S. Pat. Nos. 4,449,775 and 4,575,703 as well as U.S. patent application Ser. No. 55,283 filed on May 29, 1987, now U.S. Pat. No. 4,835,375, the carriage only is locked. In this type of locking, however, it can not be avoided that the card is erroneously displaced on the carriage or taken out of the device during the operation. For instance, U.S. Pat. No. 4,527,052 and U.S. patent application Ser. No. 747,148 filed on June 20, 1985, now U.S. Pat. No. 4,724,310, disclose locking of the IC card held and brought by the carriage in the position for reading and/or writing at the trailing edge thereof. In this type of locking, however, the spring means for normally keeping the carriage in the waiting position and drawing the carriage back to said position from the operating position when the reading and/or writing is over must be considerably strong so that such force may adversely affect on the card usually made of a thermoplastic polymer, above all of less thickness, which may cause erroneous reading and/or writing, or even make it impossible.

Meanwhile, it is necessary to establish good electrical connection between contact points of the IC card which are embedded in the plastic card to be flush with a surface of one side thereof and contact points of or yieldably planted in the contact head of the device in the operating position. For that purpose, it has been proposed to provide a contact head adapted to be relatively movable a little towards the operating position together with the card held by the carriage and concurrently vertically to contact with the card surface so as to cause scrape between the both contact points for automatical cleaning, e.g. by forming a sloped floor for said contact head (see for instance U.S. Pat. No. 4,602,351 and said U.S. patent application Ser. No. 747,148, now U.S. Pat. No. 4,724,310.

In the prior arts, however, force necessary for manually pushing the card and consequently the carriage holding the card is considerably increased by a force urging the contact head against the IC card and varied depending on the thickness thereof. A distance for said automatical cleaning of contact points is also fairly varied depending on the card thickness.

SUMMARY OF THE INVENTION

Thus, an object of the invention is provide the reader and/or writer which can avoid and overcome said defects.

The other object is to provide such device capable of locking the card and the carriage at the same time and concurrently disengaging said locks according to a simple mechanism.

The still other object is provide such device comprising a link mechanism having a pair of lever at the respective center of which the contact lever is pivoted at the opposite sides thereof as floating fulcrum so as to prevent the contact pressure of the contact head from affecting on the manually pushing the card and cause the automatic cleaning of the contact points without being varied depending on the card thickness as far as possible.

BRIEF DESCRIPTION OF THE DRAWINGS

FIG. 3A is a sectional view taken along a line III—III in FIG. 1A, for particularly showing a hook member, FIG. 3B is a similar view, in which said hook member is brought in a position for locking the IC card held on the carriage in the operative position at the trailing edge thereof, FIG. 4A is a sectional view taken along a line IV—IV in FIG. 1A, for particularly showing a lever longitudinally movable together with the carriage, FIG. 4B is a similar view but the carriage and consequently the longitudinally movable lever are brought in the operative positions, FIG. 5A is a sectional view taken along a line V—V in FIG. 1A, for particularly showing a contact head and link mechanism holding said contact head in a normal position, FIG. 5B is a similar view, in which said contact head is brought by said link mechanism in electrical engagement with the IC card on the carriage in the operative position.

DETAILED DESCRIPTION OF THE PREFERRED EMBODIMENT

Figure 6:
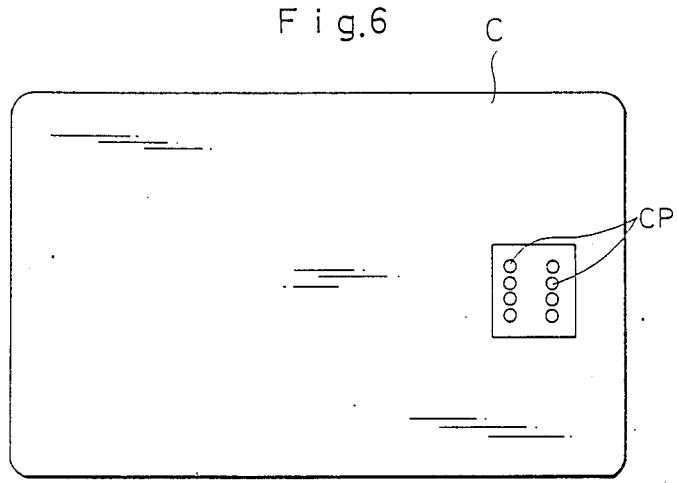
FIG. 6 is a plan view of a typical one of the IC cards.

The device according to the invention, a preferred embodiment of which is illustrated in FIGS. 1–5 is for an integrated circuit card often abridgedly called IC card as an external memory, which is generally made of a thermoplastic resin and illustrated in FIG. 6, has semiconductor memory embedded therein and a plurality of contact points CP (eight in the drawing) exposed to be flush with the surface of one side thereof and electrically connected through the device of the invention with a computer (not shown) for reading/writing.

In reference to FIGS. 1–5, the device has a casing represented generally by 10 and consisting of a front end wall 11, a back end wall 12, side walls 13, 14, a top wall 15 and a bottom wall 16. The front wall 11 is recessed in a center part 11′ so that a trailing end portion of the IC card C may partly be expose there (best shown in FIG. 1B) and formed with an inlet slit 11″ (best shown in FIGS. 3–5) for the card C. The casing 10 further has a partition wall 17, which is not always necessarily but preferably made of a metal for manufacturing in industrial scales, so as to divide a space in the casing in the upper and lower spaces.

Figure 1A:
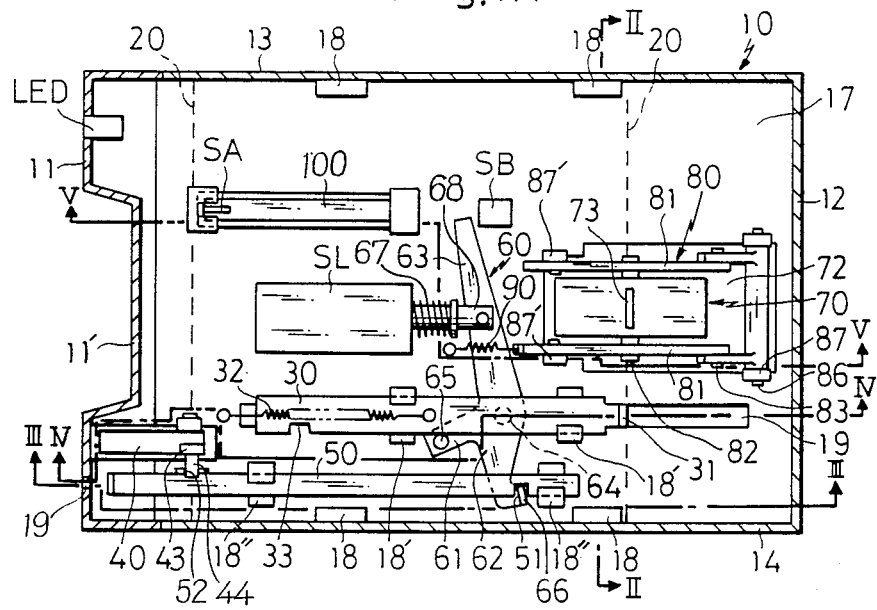
FIG. 1A is a plan view partly in section of a preferred embodiment of the device according to the invention, in which a top wall is removed.
Figure 1B:
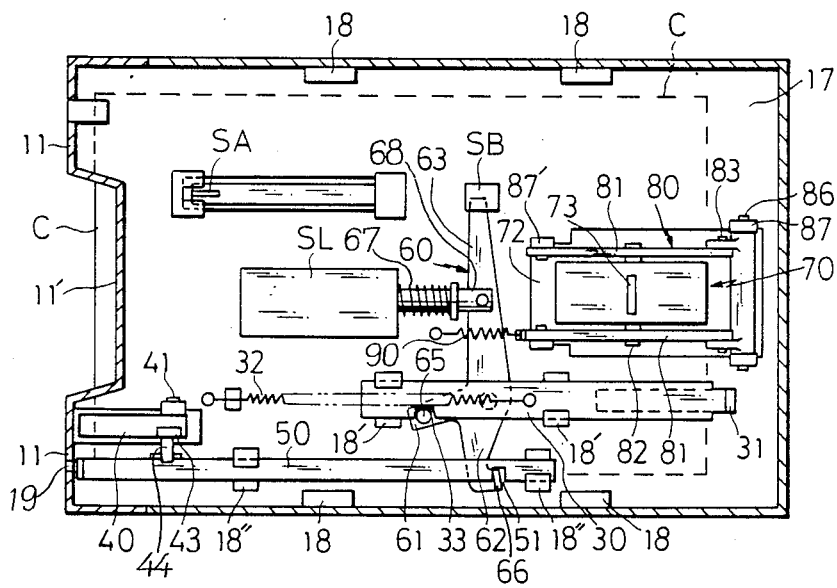
FIG. 1B is a similar view but movable members are all in respective operative positions.
Figure 2:
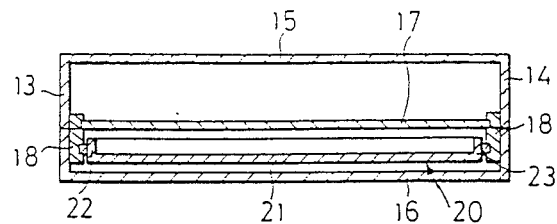
FIG. 2 is a sectional view, taken along a line II—II in FIG. 1A, where various members arranged in a casing of the device are omitted other than a movable carriage for an IC card merely for the purpose of clarity of the drawing.

In the upper space, there are various members as best shown in FIGS. 1A and 1B, fixedly or movably mounted on said partition wall 17.

In the lower space, there is provided a carriage for the card C represented generally by 20 to be movable longitudinally between a waiting position (best shown e.g. in FIG. 3A) and an operating position (best shown e.g. in FIG. 3B). Said carriage 20 is preferably in the form of a rectangular tray having a body plate portion 21, side flanges 22, 23, a back end flange 24 and an open front end. The width of said body plate portion 21 between the side flanges 22, 23 is a little larger than that of the card C, while the length of said portion 21 is made less than that of the card C, and the height of said flanges 22, 23 and 24 is made a little larger than the thickness of the card C so that the card C manually inserted through the slit 11" of the casing may pass through said open front end to abut on the back end flange 24 at the leading edge thereof to be received by the carriage 20 present in the waiting position. The carriage 20 is supported by a plurality of guide members 18 preferably made of a thermoplastic polymer and fixed on said metal partition wall 17 for longitudinal movement.

An extended lever 30 preferably made of a metal and having a downwardly bent flange 31 is mounted on the upper surface of said partition wall 17 to be longitudinally movable in the upper space of the casing with being supported by a plurality of guide members 18' also fixed on said metal wall 17. Said flange 31 downwardly extends through a slot 19 formed in said wall 17 to be fixed with the back end flange 24 of the carriage to be longitudinally moved together. Said longitudinally movable lever 30 has a coiled spring 32 one end of which is fixed thereto while the other end is fixed to the wall 17 so as to normally keep the lever 30 and consequently the carriage 20 in the waiting position (FIG. 1A, FIG. 4A).

When the card C receivey by the carriage 20 is manually pushed further against the force of said spring 32, the carriage in the lower space and the longitudinally extended lever 30 in the upper space are brought together in the operating position (FIGS. 1B and 4B).

Now in reference to FIGS. 1A, 1B, 3A and 3B, there is provided a hook member 40 in the form of a two arm lever arranged in the vicinity of the slit 11" and pivoted 41 to be angularly movable between a waiting position (FIG. 3A) and an operating position (FIG. 3B) where one arm 42 may engage with the trailing edge of the card C, which is received by the carriage 20 now in the operating position, for locking. The free end of the other arm 43 has a pin 44 planted thereon which is engaged with a notch 52 formed in another longitudinally extended lever 50 at one end thereof which is supported by a plurality of guide members 18" fixed on the wall 17 to be longitudinally movable between a waiting position (FIGS. 1A and 3A) and an operating position (FIGS. 1B and 3B) so that said hook member 40 is normally kept in the waiting position thereof but brought in the operating position for locking the card C when the second lever 50 is longitudinally moved to be in the operating position.

In order to manually operate the lever 60, that is, in order to take out the loaded card when the solenoid SL is not operable due to, for instance, power failure, there is provided a hole 19 in the front end wall 11 in a position opposed to the end face of the lever 50, so that the lever 50 is pushed by, for instance, a tip end of a ballpoint pen.

Now mainly in reference to FIGS. 1A and 1B, there is provided a three-arm lever 60 having a longitidinally extended arm 61, a transversely extended arm 62 and a third arm 63 also transversely extended but in the direction opposite to said second arm 62 and pivoted 64 on the wall 17 at a center, from which said three arms are respectively extended, for angular movement.

Said first arm 61 has a stopper pin 65 planted near the free end thereof so as to normally urgingly abut on the side edge of the first longitudinally movable lever 30 but engage in a notch 33 formed in the lever at the side edge when the three-arm lever 60 is angularly moved to be in an operating position in FIG. 1B.

Said transversely extended arm 62 has a vertically protruded flange 66 at the free end so as to engage with a notch 51 formed in the second longitudinally movable lever 50 at the side edge thereof so that the angular movment of the three-arm lever 60 may cause the longitudinal movement of the lever 50.

The third arm 63 is pivotally engaged with the free end of an armature rod 68 of a solenoid SL so that when the soleoid SL is energized, the armature rod 68 normally retracted (see FIG. 1A) but adapted to be brought in the position in FIG. 1B by a spring. means 67 is retracted to angularly move said three-arm lever 60 from the position in FIG. 1B to the position in FIG. 1A against the force of the spring means 67.

Now in reference to FIGS. 1A, 1B and above all FIGS. 5A, 5B, a contact head which is represented generally by 70 and a plurality of contact point or yieldingly planted contact pins 71 of which number and arrangement correspond to those of the contact points CP of the card C to be used, is arranged in the upper space of the casing at a position where the card C carried by the carriage 20 to be in the operating position in the lower space may be opposed to said contact head 70 so as to establish electric engagement of the contact points 71 and CP through a window 72 formed in the partition wall 17. Through leads 73 extended from the contact points 71 (see FIGS. 1A and 1B), the contact points CP of the card C may be electrically connected with the computer not shown for reading/writing.

The contact head 70 is supported by a particular link mechanism represented generally by 80 on the partition wall so that a necessary contact pressure of the head 70 on the card C may not considerably affect on the force necessary for pushing the card C to bring the carriage 20 to be in the operating position regardless of varied thickness of the card C and differential stroke to be caused thereby between the contact head 70 and the card C movements with contacting each other may attain a proper cleaning effect.

The link mechanism 80 comprises a pair of link levers 81 pivoted 82 at the respective center with the contact head 70 at the opposite sides thereof, each of said levers 81 being pivoted 83 at one end thereof with each one arm 84 of a pair of two arm levers, the other arms 85 of which are downwardly protruded through said window 72 to be abutted with a leading end wall of the carriage 20 which is being brought in the operating position thereof by manually pushing the card C (see FIG. 5B). The pair of two-arm levers 84, 85 are pivoted 86 at the respective center thereof with a pair of studs 87 respectively fixed on the partition wall 17. Each of the levers 81 is formed with a slot 88 at the other end which is fitted with each of pins 89 on a pair of other studs 87' respectively fixed on the wall 17.

It is noted that the pivots 82, 83 act as floating fulcrums different from the fixed fulcrums 86, 89, when the two-arm levers 84, 85 are angularly moved by abutting of the carriage 20 at the leading end thereof on the downwardly protruded arms 85, which causes downward and forward movement of the pairs of levers 81 against a force of spring means 90 to normally keep said levers in the waiting position (FIG. 5A) and consequently of the contact head 70 pivoted 82 therewith.

It is added that a sensor SB is arranged on the wall 17 in the vicinity of the third arm 63 so as to detect the presence of said arm 63 in the operating position and consequently of the card C in the writing/reading position to generate related signals which commence the writing/reading operation and operate an undermentioned light emitting diode LED, the light emitting diode LED is provided for instance in the vicinity of the forward end wall 11 of the casing on the wall 17 so as to receive the signal from the sensor SB and indicate that the card C is locked in the operating, and a sensor SA is mounted on the wall 17 so as to cooperate with a leaf spring 100 and detect that the card unlocked after the writing/reading operation is in the casing and actuate a related circuit to generate a signal for instance in the form of synthesized voice "Take Out Card Now" after lapse of a predetermined time after the solenoid SL is energized and the card C is released. The leaf spring 100 also acts as brake for the card C when the card is moved together with the carriage 20 by the force of the spring 32 after the card is unlocked, so as to prevent the card from completely coming out the slit 11" in ejection.

Now in operation, when the card C is inserted through a slit 11" in the casing 10 with the contact points CP upside and forward to abut at the leading edge thereof on the back flange 24 of the carriage 20 and further manually pushed, the leaf spring 100 is forced down to bring the sensor SA to an operating condition and the carriage 20 and consequently the first longitudinal lever 30 are moved together forward against the force of the coiled spring 32 towards the operating position shown in FIGS. 1B, 3B, 4B and 5B, during which the two-arm lever 84, 85 is angularly moved in consequence of abutment of the downwardly protruded arm 85 on the carriage leading wall as referred to above. Thereby the contact points CP of the card C and the tip ends of the resiliently planted contact pins or contact points 71 of the contact head 70 are relatively slided for cleaning, after which there is established electrical connection therebetween for the writing/reading.

At the same time, the first longitudinal lever 30 is longitudinally moved together with the carriage 20 so that the notch 33 formed in said lever 30 at the side edge thereof is engaged with the pin 65 fixedly planted on the longitudinal arm 61 and urged on the side edge of the coiled spring 67 loaded on the armature rod 68 for locking the first lever 30 and consequentloy the carriage 20 in the operating position, whereby the card C is not deteriorated by the force of the coiled spring 32 otherwise to affect adversely on the card locked by the hook member 40 through the back end flange 24 of the carriage.

The angular movement of the three-arm lever 60 in the clockwise direction from position in FIG. 1A to FIG. 1B caused by said engagement of the pin 65 slipped in the notch 33 causes the second longitudinal lever 50 to longitudinally move towards the front end wall 11 owing to the engagement of the flange 66 of the transverse arm 62 of the three-arm lever with the notch 51 formed in the second lever 50 at the side edge thereof, which then causes angular movement of the hook member 40 on the pivot 41 due to the engagement thereof with said second longitudinal lever 50 through the pin 44 for locking the card C at the trailing edge, which is necessary for preventing the card C erroneously taken out of the device during the writing/reading operation. The angular movement of the three-arm lever 60 causes signal to allow starting the writing/reading operation as referred to above by means of the second sensor SB detecting the third arm 63 moved thereon.

When the writing/reading operation is over, the solenoid SL is energized to retract the armature against the force of the spring 67 so as to angularly move the three-arm levers 60 on the pivot 64 in the counterclockwise direction (from position in FIG. 1B to the position in FIG. 1A), which causes disengagement of the first lever 30 at the notch 33 from the longitudinal arm 61 with the pin 65 and longitudinal movement of the second lever 50 in the direction going away from the front end wall 11, whereby the hook member 40 is angularly moved to disengage locking of the card C.

Now when the card C is thus released and the first longitudinal lever 30 is released from engagement with the first arm 61 as referred to above, the carriage 20 making an assembly together with said first lever 30 owing to connection of the downwardly bent portion 31 with the back end flange 24 is pulled towards the normal position together with the card C thereon (FIG. 1A, FIG. 4A) by the coiled spring 32. At the sametime, the link mechanism 80 of which downwardly protruded arm 85 is released from the carriage 20, and consequently the contact head 70 is brought in the normal position due to the related coiled spring 90.

The card C, a trailing end portion of which is exposed at the recessed portion 11' of the front end wall 11 can be taken out of the device.

After the carriage 20 and therefore the card C is unlocked, the sensor SA watches whether the card is drawn out from the casing 10 or not. If the card C remains in the casing and therefore the sensor SA detects the existence of the card even after lapse of a predetermined time after the card is unlocked, a suitable warning means such as a voice generator or a lamp is operated to call operator's attention.

When automatic ejection should be made impossible by reason of inoperability of the solenoid SL due to trouble or power failure, the second longitudinal lever 50 is pushed at the free end through the hole 19 formed in the front end wall 11 e.g. by a tip end of a ball-point pen so as to angularly move the three-arm lever 60 by means of engagement by the flange-notch of said levers 50 and 60 which causes the same result caused by energization of the solenoid SL as referred to above.

What is claimed is:

1. Reader and/or writer for an IC card having a plurality of contact points flush with the surface of one side of said card, comprising:

a casing having a front end wall formed with a slit for inserting said card, opposite side walls, a back end wall, a top wall and a bottom wall, a contact head having a corresponding number of contact points adapted to be electrically connected with said contact points of said card and arranged in the casing near to said back end wall, a carriage longitudinally movable in the casing between a waiting position near to said front end wall for receiving said card inserted through said slit and an operating position where the card held thereby may establish said electrical connection with said contact head, spring means for normally keeping said carriage in said waiting position, means for locking said carriage at said operating position to be actuated when said carriage is brought there by manually pushing said card against the force of said spring means, means for locking said card at the trailing edge thereof to be actuated when said carriage holding said card is brought in said operating position, and means for disengaging both said first and second locking means at the same time to be actuated when reading and/or writing is over so that said carriage is returned to the waiting position by said spring means and consequently said card held by said carriage may be taken out of the device through said slit.

2. Reader and/or writer as set forth in claim 1, in which said carriage is in the form of a rectangular tray having a body plate, an open front end, a back end flange to be abutted with said card passing through said open front end to be held on said body plate and opposite side flanges.

3. Reader and/or writer as set forth in claim 1, in which said first locking means comprises a lever adapted to be longitudinally movable together with said carriage so that when said lever is brought in said operating position together with said carriage against the force of said spring means said lever is engaged with a stopper to lock said carriage there.

4. Reader and/or writer as set forth in claim 3, in which said lever is formed with a notch at the side edge thereof and said stopper is normally resiliently urged against said edge so as to slip in said notch when said lever is brought in said operating position together with said carriage.

5. Reader and/or writer as set forth in claim 1, in which said second locking means comprises an angularly movable hook member mechanically connected with said carriage so that when said carriage is brought in said operating position said hook member is angularly moved to lock the trailing edge of said card held by carriage.

6. Reader and/or writer as set forth in claim 5, in which said second locking means further comprises another longitudinally movable lever mechanically connected with said hook member at one end thereof and with said carriage so that when said carriage is brought in said operating position said another lever member is longitudinally moved, whereby said hook member is angularly moved to lock the trailing edge of said card.

7. Reader and/or writer as set forth in claim 6, in which said second locking means comprises a lever adapted to be longitudinally movable together with said carriage and mechanically connected with said another longitudinally movable lever so that when said first lever is brought in said operating position together with said carriage, said first lever is engaged with a stopper to lock said carriage there and said second lever is longitudinally moved to angularly move said hook member for concurrently locking the card at the trailing edge thereof.

8. Reader and/or writer as set forth in claim 7, in which a hole is formed in the front end wall of the casing, through which said another longitudinally movable lever can be longitudinally moved so as to manually disengage the engagement of the stopper with the first lever and move the hook member for concurrently unlocking the card.

9. Reader and/or writer as set forth in claim 1, in which said disengaging means comprises a solenoid having an armature rod and a three-arm lever pivoted for angular movement between first and second positions, but normally resiliently kept in said first position by a spring means and having a first arm having a pin planted thereon near the free end thereof, a second arm having a bent flange at the free end thereof and a third arm pivoted with the free end of said armature rod, and which further comprises;

a first lever as said first locking means adapted to be longitudinally movable together with said carriage and having a notch formed at the side edge thereof which is engaged with said pin normally resiliently urge on said side edge when said carriage and consequently said first lever is brought in said operating position for locking said carriage there, an angularly movable hook member as said second locking means, and a second lever longitudinally movable and mechanically connected with said hook member at one end thereof and having a notch formed at the side edge thereof to be engaged with said bent flange of said second arm so that when said carriage and consequently said first lever is brought in said operating position, said hook member is actuated for concurrently locking said card at the trailing edge thereof, wherein when said solenoid is energized when reading and/or writing is over said three-arm lever is angularly moved back to the first position so as to disengage said double locking at the same time.

10. Reader and/or writer as set forth in claim 1, in which said contact head is held on the casing by a link mechanism to be movable from a first position normally resiliently held there downwardly and forwardly to a second position where the contact points of said contact head may electrically connect with the contact points of the card.

11. Reader and/or writer as set forth in claim 10, in which said link mechanism comprises a pair of link levers pivoted at the respective center with the contact head at the opposite sides thereof, each of said levers being pivoted at one end thereof with each one arm of a pair of two-arm levers each pivoted on the casing, the other arms of which are downwardly protruded to be abutted with a leading end of said carriage which is being brought in said operating position, each of said pair of levers being formed with a slot engaged with a pin fixed on the casing, whereby when said downwardly protruded arms are abutted with the carriage at the leading end thereof said contact head is brought in said second position.

12. Reader and/or writer as set forth in claim 1, further comprising a sensor for detecting that the card is being locked.

13. Reader and/or writer as set forth in claim 1, further comprising a sensor for detecting that the card is in the casing, said sensor cooperating with a leaf spring which acts as a brake for the card in ejection.

* * * * *